US010126782B2

(12) United States Patent
Gao et al.

(10) Patent No.: US 10,126,782 B2
(45) Date of Patent: Nov. 13, 2018

(54) ELECTRONIC DEVICE

(71) Applicant: Lenovo (Beijing) Limited, Beijing (CN)

(72) Inventors: Fei Gao, Beijing (CN); Yu Chen, Beijing (CN)

(73) Assignee: Lenovo (Beijing) Limited, Beijing (CN)

(*) Notice: Subject to any disclaimer, the term of this patent is extended or adjusted under 35 U.S.C. 154(b) by 575 days.

(21) Appl. No.: 14/553,359

(22) Filed: Nov. 25, 2014

(65) Prior Publication Data

US 2015/0346764 A1    Dec. 3, 2015

(30) Foreign Application Priority Data

Jun. 3, 2014 (CN) .......................... 2014 1 0242592

(51) Int. Cl.
*G06F 1/16* (2006.01)
(52) U.S. Cl.
CPC .......... *G06F 1/1652* (2013.01); *G06F 1/1601* (2013.01); *G06F 1/163* (2013.01); *G06F 1/1654* (2013.01)
(58) Field of Classification Search
CPC ...... G06F 1/1601; G06F 1/163; G06F 1/1652; G06F 1/1654
See application file for complete search history.

(56) References Cited

U.S. PATENT DOCUMENTS

| 2005/0092539 A1* | 5/2005 | Chitalia | B60N 2/002 180/271 |
| 2014/0275852 A1* | 9/2014 | Hong | A61B 5/02427 600/301 |
| 2015/0227245 A1* | 8/2015 | Inagaki | G06F 3/0412 345/173 |

FOREIGN PATENT DOCUMENTS

| CN | 102142207 A | 8/2011 |
| CN | 203028296 U | 7/2013 |
| CN | 203149296 U | 8/2013 |

(Continued)

OTHER PUBLICATIONS

"Chinese Application No. 201410242592.8, Office Action dated Dec. 1, 2017", w/ English Translation, (Dec. 1, 2017), 19 pgs.

*Primary Examiner* — Hai Phan
*Assistant Examiner* — Franklin Balseca
(74) *Attorney, Agent, or Firm* — Schwegman Lundberg & Woessner, P.A.

(57) ABSTRACT

The present disclosure provides an electronic device. The electronic device includes a display unit and a data acquisition unit, wherein the electronic device can be attached to an object and can be maintained in a relative position relationship with the object, and at least a part of the electronic device and an external surface of the object meet a predefined condition; and the data acquisition unit is connected to the display unit, and is configured to acquire data related to the object when the electronic device is attached to the object; and the display unit is further configured to display the data. The electronic device in the present disclosure can be attached to a variety of objects, and can acquire data related to the objects and then display the data on the display unit, to achieve the technical effect of enabling an object which is a non-electronic device and an electronic device without a display unit to have a display unit. In addition, the electronic device can be applicable to a variety of objects, thereby saving cost of manufacturing a plurality of displays.

12 Claims, 3 Drawing Sheets

(56) References Cited

FOREIGN PATENT DOCUMENTS

CN 103750823 A 4/2014
KR 20130064714 A 6/2013

* cited by examiner

ELECTRONIC DEVICE

CROSS-REFERENCE TO RELATED APPLICATION(S)

This application claims priority to Chinese Application No. 201410242592.8 filed on Jun. 3, 2014, which is incorporated herein by reference in its entirety.

BACKGROUND

Technical Field

The present disclosure relates to a field of electronic technology, and in particular, to an electronic device.

Related Art

With the development of electronic technology, more and more electronic devices come out. However, if each electronic device is configured with a display unit, there will be extremely high cost on the display units for tens of thousands of electronic devices, including high cost on both material and time.

In addition, objects which are non-electronic devices, such as human bodies, various articles for daily's life, will not be configured with display units, and if parameters of these objects are to be acquired, a variety of instruments are needed for collecting these parameters respectively. Thus, a user needs to buy various kinds of instruments at the same time, which results in high cost, and the user needs to replace different instruments for collection, which is inconvenient for use.

SUMMARY

Embodiments of the present disclosure provide an electronic device for solving a technical problem with conventional solutions that there is no display device applicable to a variety of objects.

In an aspect of the present disclosure, an electronic device is provided, comprising a display unit and a data acquisition unit;

wherein the electronic device can be attached to an object and can be maintained in a relative position relationship with the object, and at least a part of the electronic device and an external surface of the object meet a predefined condition; and the data acquisition unit is connected to the display unit, and is configured to acquire data related to the object when the electronic device is attached to the object; and the display unit is further configured to display the data.

Alternatively, the display unit has a first state in which the display unit is a non-planar display unit.

Alternatively, the display unit further has a second state in which a curvature of the display unit is different from that in the first state, or in which a shape of the display unit is different from that in the first state.

Alternatively, the display unit can be switched between the first state and the second state according to a shape of the object to which the electronic device is attached.

Alternatively, the data acquisition unit further comprises an internal collection unit and/or an external collection unit, wherein the internal collection unit is configured to collect state data of the electronic device; and the external collection unit is configured to collect data unrelated to the electronic device.

Alternatively, the data unrelated to the electronic device comprise environment data and/or operator data.

Alternatively, the data acquisition unit further comprises a communication unit configured to communicate data with a second electronic device.

Alternatively, the communication unit comprises a communication connection interface, through which the electronic device can be attached to the object when the electronic device is connected to the second electronic device.

Alternatively, the electronic device further comprises:
a connection unit configured to fix the electronic device to the object.

Alternatively, the electronic device is a deformable device and can be attached to the object by deformation.

Alternatively, the electronic device further comprises:
an identification unit configured to identify a type of the object to which the electronic device is attached, and to turn on one of the data acquisition units corresponding to the type, in order to acquire the data related to the object.

One or more technical solutions according to the embodiments of the present disclosure provide at least the following technical effects or advantages.

In an embodiment of the present disclosure, an electronic device includes a display unit and a data acquisition unit, wherein the electronic device can be attached to an object and can be maintained in a relative position relationship with the object, and at least a part of the electronic device and an external surface of the object meet a predefined condition; and the data acquisition unit is connected to the display unit, and is configured to acquire object data when the electronic device is attached to the object; and the display unit is further configured to display the data. It can be seen that the electronic device according to the present embodiment can be attached to the object, can be maintained in the relative position relationship with the object, and can acquire data related to the object to which the electronic device is attached, thereby displaying the acquired data on the display unit. In other words, the electronic device according to the embodiment of the present disclosure may be used as a display accessory, achieving a technical effect of enabling an object which is a non-electronic device and an electronic device without a display unit to have a display unit. In addition, the electronic device can be applicable to a variety of objects, thereby saving cost of manufacturing a plurality of displays. Further, as the electronic device is attached to the object and can be maintained in the relative position relationship with the object, integration between the electronic device and the object may be enhanced.

DETAILED DESCRIPTION OF THE EMBODIMENTS

Embodiments of the present disclosure provide an electronic device for solving the technical problem with the conventional solution that there is no display device applicable to a variety of objects.

In order to solve the above technical problem, a general idea of the technical solutions according to the embodiments of the present disclosure is as follows:

In an embodiment of the present disclosure, an electronic device includes a display unit and a data acquisition unit, wherein the electronic device can be attached to an object and can be maintained in a relative position relationship with the object, and at least a part of the electronic device and an external surface of the object meet a predefined condition; and the data acquisition unit is connected to the display unit, and is configured to acquire object data when the electronic device is attached to the object; and the display unit is further configured to display the data. It can be seen that the electronic device according to the present embodiment can be attached to the object, can be maintained in the relative position relationship with the object, and can acquire data related to the object to which the electronic device is attached, thereby displaying the acquired data on the display unit. In other words, the electronic device according to the embodiment of the present disclosure may be used as a display accessory, achieving a technical effect of enabling an object which is a non-electronic device and an electronic device without a display unit to have a display unit. In addition, the electronic device can be applicable to a variety of objects, thereby saving cost of manufacturing a plurality of displays. Further, as the electronic device is attached to the object and can be maintained in the relative position relationship with the object, integration between the electronic device and the object may be enhanced.

For better understanding the above technical solutions, the above technical solutions will be described in detail below with reference to accompanying drawings of the description and specific embodiments.

Figure 1:
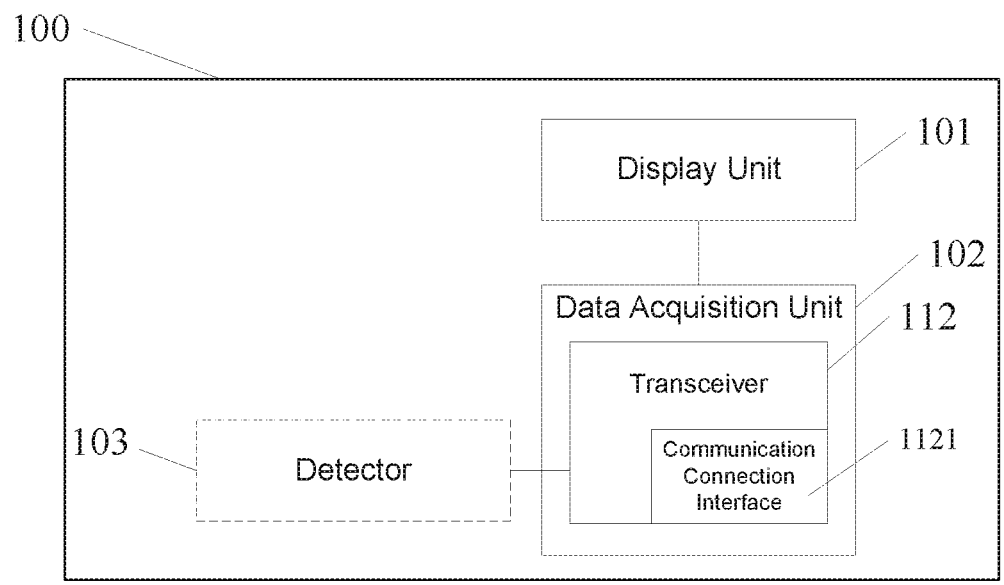
FIG. 1 is a functional block diagram of an electronic device according to an embodiment of the present disclosure.

In an embodiment of the present disclosure, an electronic device is provided. As shown in FIG. 1, the electronic device 100 includes a display unit 101 and a data acquisition unit 102.

The electronic device 100 may be used as an input and output accessory, and may implement functions similar to a touch panel and a display. The electronic device 100 may also exist as a separate apparatus, for example, a mobile phone, a tablet etc.

The electronic device 100 may be attached to an object, and may be maintained in a relative position relationship with the object. At least a part of the electronic device 100 and an external surface of the object meet a predefined condition. The data acquisition unit 102 is connected to the display unit 101, and is configured to acquire data related to the object when the electronic device 100 is attached to the object; and the display unit 101 is further configured to display the data.

It can be seen that the electronic device according to the present embodiment can be attached to the object, can be maintained in the relative position relationship with the object, and can acquire data related to the object to which the electronic device is attached, thereby displaying the acquired data on the display unit. In other words, the electronic device according to the embodiment of the present disclosure can be used as a display accessory, achieving the technical effect of enabling an object which is a non-electronic device and an electronic device without a display unit to have a display unit. In addition, the electronic device can be applicable to a variety of objects, thereby saving cost of manufacturing a plurality of displays. Further, as the electronic device is attached to the object and can be maintained in the relative position relationship with the object, integration between the electronic device and the object may be enhanced.

In a specific implementation, the display unit 101 may particularly be a liquid crystal display unit, or other types of display units. The display unit 101 may particularly be a touch display unit, or a non-touch display unit.

A shape of the display unit 101 may be changeless, for example, a plane, a curved surface such as an arched shape, a wave shape etc. Alternatively, the shape of the display unit 101 may be deformable, for example, from a plane to a curved surface, or from a curved surface with a first curvature to a curved surface with a second curvature, or from a curved surface in a first shape to a curved surface in a second shape. For clarity of the description, the display unit 101 may be in a first state in which the display unit 101 is a non-planar display unit. Alternatively, the display unit 101 may be in a second state in which a curvature of the display unit 101 is different from that in the first state, or a shape of the display unit 101 is different from that in the first state. In other words, the display unit 101 may particularly be a deformable display unit, such as a flexible screen.

In a further embodiment, the display unit 101 may be switched between the first state and the second state according to a shape of an object to which the electronic device 100 is attached. In an example, when the object to which the electronic device 100 is attached has an arched portion, the display unit 101 may be deformed to be an arched shape to be wrapped around the arched portion of the object, and may further change its radian accordingly depending on the object to which the electronic device 100 is attached, so as to facilitate the electronic device 100 to be attached to the object. When a surface of another object is a plane, the display unit 101 may be deformed to a plane, so as to facilitate the electronic device to be attached to the object.

When the display unit 101 is particularly a flexible screen, with the structure of the electronic device according to the embodiment of the present disclosure, not only an effect of configuring a variety of objects with a flexible screen may be achieved, but also cost of manufacturing a plurality of flexible screens may be reduced. Further, with the structure of the electronic device according to the embodiment of the present disclosure, the electronic device may be attached to various objects in different shapes, and therefore may be applicable in many usage scenarios and may not be limited to only one shape.

How to attach the electronic device to the object will be described below.

A possible implementation is that the electronic device further includes a connection unit, through which the electronic device can be fixed to the object.

For example, the connection unit is particularly a sucker arranged on a side of the electronic device opposite to the display unit 101. When the electronic device needs to be attached to an object, the sucker may be absorbed to a surface of the object. In this way, the electronic device may be fixed to the object and is enabled to be maintained in a relative position relationship with the object. At least a part of the electronic device and an external surface of the object meet a predefined condition. For example, a gap between the side of the electronic device opposite to the display unit 101 and the external surface of the object is less than a threshold.

In other words, there maintained a relative position relationship between the electronic device and the object, i.e. having a gap therebetween. The gap may also be 0, in which case the electronic device is perfectly fitted to the object. That is, the overall side of the electronic device opposite to the display unit 101 is perfectly fitted to the surface of the object, or a part of the side of the electronic device opposite to the display unit 101 is perfectly fitted to the surface of the object. Particularly, in an example, the electronic device is absorbed to glass by the sucker. In another example, when the electronic device is a deformable device, the electronic device may be absorbed to a cup or other object with a non-planar external surface by the sucker.

In another example, when the electronic device is the deformable device, the connection unit may particularly include a first connection member arranged at a first end of the electronic device, and a second connection member arranged at a second end of the electronic device. When the electronic device needs to be attached to an object, the electronic device may be wrapped around the external surface of the object, and then be fixed to the external surface of the object by cooperation between the first connection member and the second connection member. Particularly, in an example, both the first connection member and the second connection member are magnets with opposite magnetic properties. In another example, the first connection member is a hook, and the second connection member is a snap.

The above description is merely illustrative, and is not intended to limit the present disclosure. In practice, the connection unit may be particularly implemented in other forms, which may be easily contemplated by those skilled in the art according to the above description.

Another possible implementation is that the electronic device is a deformable device and can be attached to the object by deformation of the electronic device.

In an example, the electronic device may be bended to be wrapped around a cup or other object with a non-planar external surface, and the electronic device may be maintained in the deformed state after being bended. Therefore, the electronic device may be maintained in the relative position relationship with the object. As such, the electronic device may be attached to the object. In this way, the electronic device may be easily attached to the object without additional fixing elements. Therefore, the electronic device has a simple structure and is convenient to use.

A further possible implementation is that in a case that the data acquisition unit 102 includes a communication unit 112, which may be a wired communication unit and/or a wireless communication unit. The wired communication unit will be connected to a second electronic device through a wired communication interface 1121 included in the communication unit 112. Through the wired communication interface 1121, not only the electronic device may be fixed to the second electronic device during data exchange, but also the electronic device may be maintained in a relative position relationship with the second electronic device. In this implementation, the object is the second electronic device.

Further, in this implementation, the wireless communication unit is configured to communicate data with the second electronic device, or acquire related network data from a server.

In an example, when the electronic device is attached to the second electronic device, data running in the second electronic device may be acquired through the communication unit 112 and be displayed on the display unit 101. Further, when the display unit 101 is particularly a touch display unit 101, the second electronic device may further be controlled by the display unit 101, and a control instruction for the second electronic device may be transmitted to the second electronic device through the communication unit 112.

Alternatively, the data acquisition unit 102 may be implemented in another way. For example, the data acquisition unit 102 may particularly include an internal collection unit and/or an external collection unit. The internal collection unit is configured to collect state data of the electronic device; and the external collection unit is configured to collect data unrelated to the electronic device.

The internal collection unit collects the state data of the electronic device, such as a speed, gravity etc. of the electronic device per se, and displays the collected data on the display unit 101. In an example, when the electronic device is attached to a moving object, speed related parameters may be collected by the internal collection unit and be displayed on the display unit 101. Thus, the movement speed of the object may be known by the user based on the displayed data.

The external collection unit collects data unrelated to the electronic device, including data of the object to which the electronic device is attached and data corresponding to the object to which the electronic device is attached. With respect to the data of the object to which the electronic device is attached, in an example, when the electronic device is attached to a certain part of a human body, physiological characteristics parameters such as a pulse, a heartbeat, a fingerprint etc. of the human body may be collected. In another example, when the electronic device is wrapped around the cup, parameters such as a temperature, quantity etc. of liquid in the cup are detected by the external collection unit such as a temperature sensor, and the temperature is displayed on the display unit 101. Thus, a condition related to the liquid in the cup may be known by the user.

With respect to the data corresponding the object to which the electronic device is attached, in an example, when the electronic device is attached to glass of a window, current illumination intensity, ultraviolet rays and an atmospheric temperature may be collected by the external collection unit, and these parameters may be displayed on the display unit 101. Thus, these weather parameters may be known by the user.

In another aspect, the data unrelated to the electronic device include environment data and/or operator data. For example, the environment data are particularly the above weather parameters, and the operator data are particularly motion parameters of a pulse and/or tendons of an operator, which are collected by the external collection unit when the electronic device is attached to a wrist of the operator. Further, the electronic device may transmit the collected parameters of the operator to another electronic device, for ease of control of the other electronic device.

In order to enable the electronic device to be applicable to various scenarios, to be attached to a variety of objects, and to acquire various data, there may be various types of data acquisition units 102 and a plurality of data acquisition units 102. During use of the data acquisition units, the various data acquisition units 102 may be always maintained in an on state; or may be controlled to be in an off state, and a corresponding data acquisition unit 102 may be turned on only when the electronic device is attached to the object, thereby saving power.

Therefore, the electronic device 100 may further include an identification unit 103 configured to identify a type of the object to which the electronic device is attached, and to turn on one of the data acquisition units 102 corresponding to the type to acquire the data of the object.

In an example, when the electronic device is attached to a certain part of the human body, the identification unit may identify the certain part of the human body, and the electronic device controls the data acquisition unit, which collects physiological characteristics parameters of the human body, to be turned on for data collection.

Particularly, when the electronic device is attached to other object, the identification unit may identify the object according to the shape, material etc. of the object, so as to determine the type of the object to which the electronic device is attached, thereby controlling a corresponding data acquisition unit to be turned on.

Application scenarios of the electronic device according to the embodiment of the present disclosure will be described in detail below by way of several specific examples.

Figure 2:
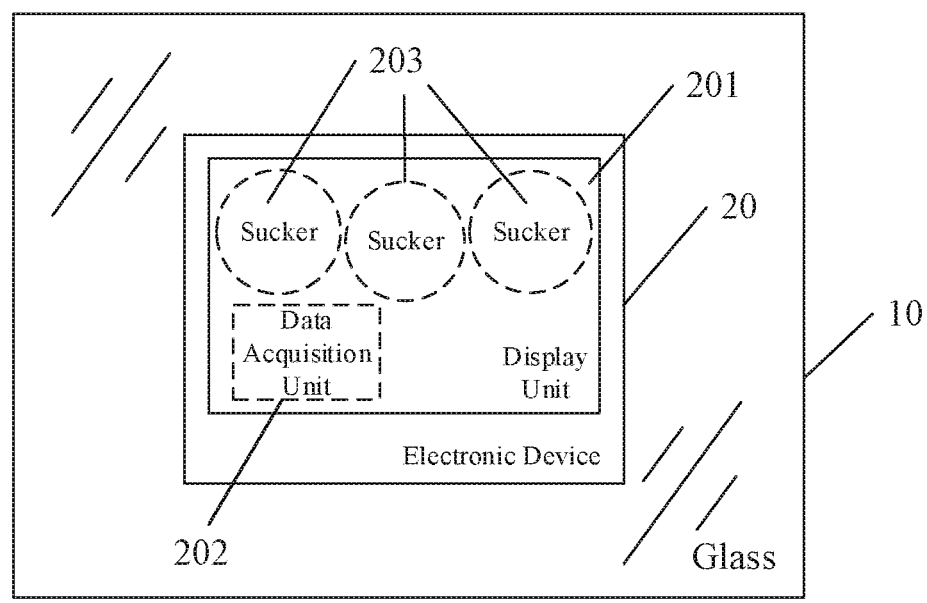
FIG. 2 is a schematic diagram of an application scenario of an electronic device according to a first embodiment of the present disclosure.

In a first example, in the present embodiment, the display unit may be not only a flexible screen, but also a non-flexible screen. As shown in FIG. 2, the electronic device 20 is absorbed to glass 10 of a room by a sucker 203, and may be maintained in a relative position relationship with the glass 10 as shown in FIG. 2, until the electronic device 20 is taken down by the user.

When the electronic device 20 is absorbed to the glass 10, the data acquisition unit 202 such as a thermometer, a light intensity detection unit, an ultraviolet ray detection unit etc. starts to acquire an external temperature, light intensity, and ultraviolet rays. Then, the parameters acquired by the acquisition unit 202 may be directly displayed on the display unit 201, or may be displayed on the display unit 201 after being processed. At the same time, other related external parameters acquired from the server by the wireless communication unit may also be displayed together on the display unit 201. In the present embodiment, the data acquired by the data acquisition unit 202 are data corresponding to the object, and may also be classified as environment data.

Figure 3:
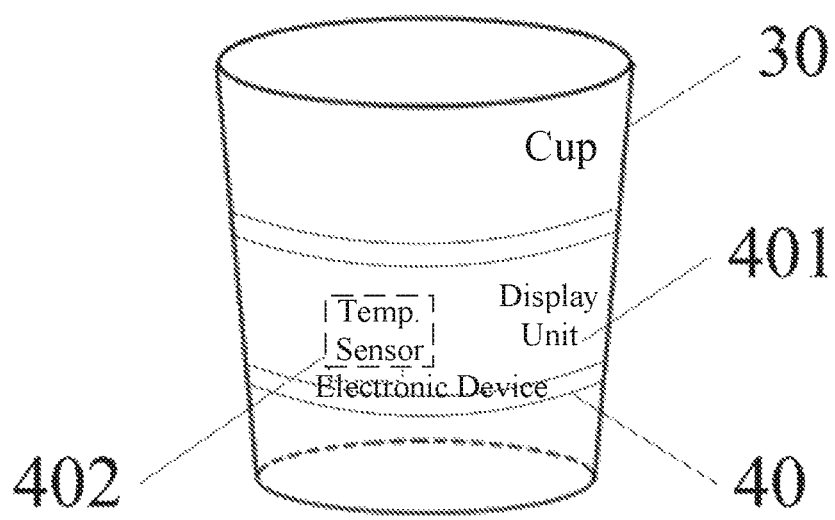
FIG. 3 is a schematic diagram of an application scenario of an electronic device according to a second embodiment of the present disclosure.

In a second example, in the present embodiment, the display unit is particularly a flexible screen. As shown in FIG. 3, the electronic device 40 is attached to a cup 30 by the sucker or an attractive force between magnetic elements at both ends of the electronic device 40, and the electronic device 40 may be maintained in a relative position relationship with the cup 30 as shown in FIG. 3, until the electronic device 40 is taken down by the user.

When the electronic device 40 is attached to the cup 30, a temperature sensor 402 may detect a temperature of liquid in the cup 30, and the detected temperature may be displayed on a display unit 401. In the present embodiment, the data acquired by the temperature sensor 402 are data corresponding to the object.

Figure 4:
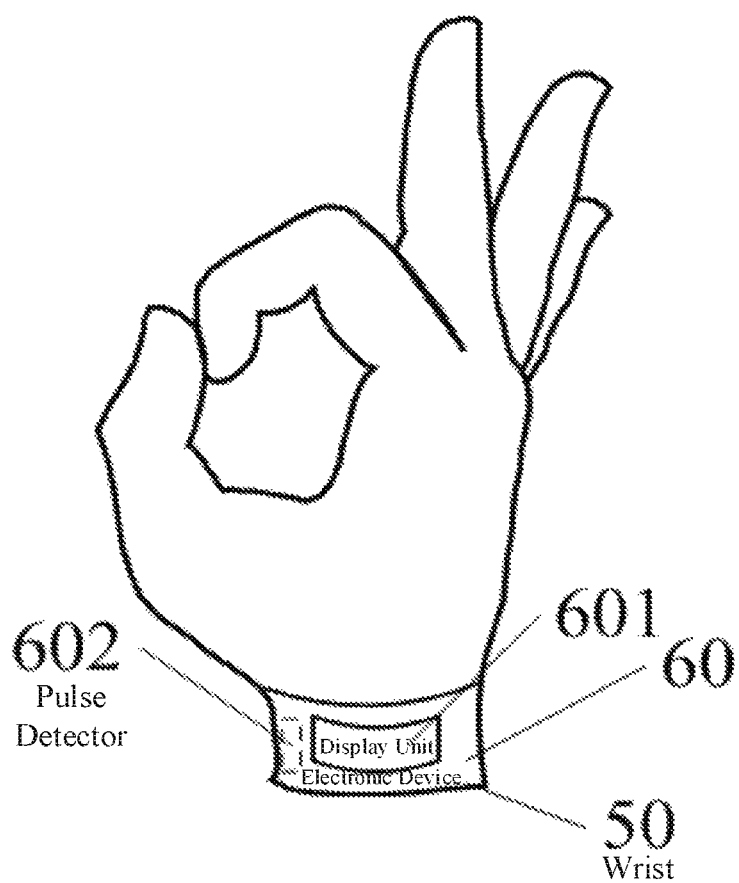
FIG. 4 is a schematic diagram of an application scenario of an electronic device according to a third embodiment of the present disclosure.

In a third example, in the present embodiment, the display unit is particularly a curved screen. As shown in FIG. 4, the electronic device 60 is attached to a wrist 50 of a user through connection members (not shown) at both ends of the electronic device 60, such as a hook and a snap, and a relative position therebetween may be maintained to be unchanged, until the electronic device 60 is taken down by the user. In principle, a position of a pulse detector 602 is configured for convenience of pulse detection.

When the electronic device 60 is attached to the wrist, the pulse detector 602 detects a pulse of the user, and the detected data are displayed on a display unit 601. In the present embodiment, the data acquired by the pulse detector 602 are operator data.

Further, the electronic device 60 may control another electronic device according to the data acquired by the pulse detector 602.

Figure 5:
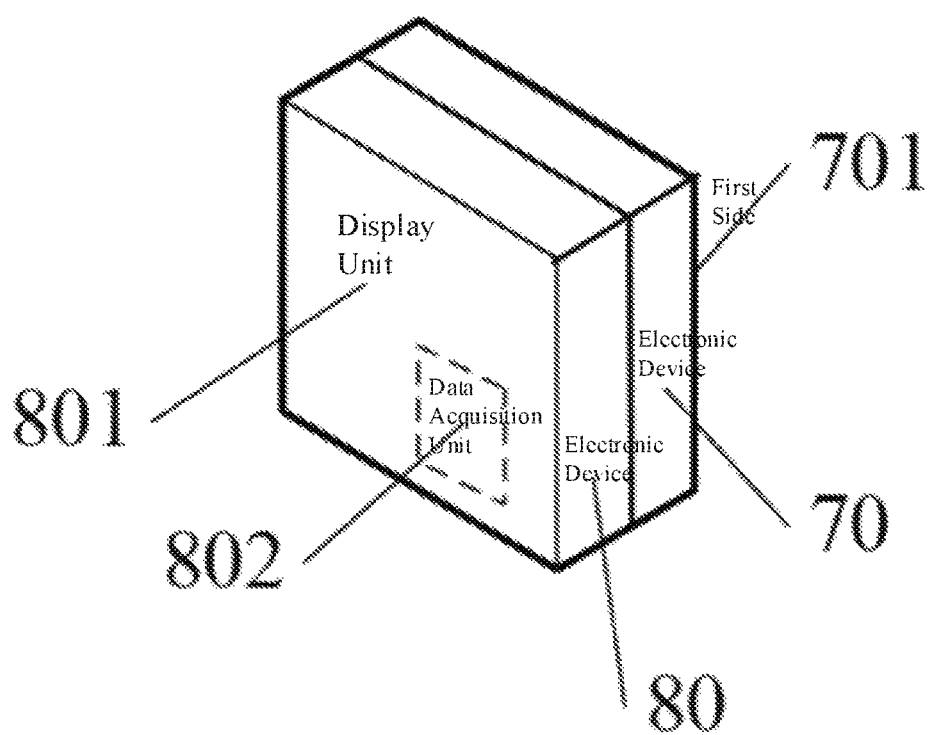
FIG. 5 is a schematic diagram of an application scenario of an electronic device according to a fourth and a fifth embodiments of the present disclosure.

In a fourth example, in the present embodiment, the display unit may be not only a flexible screen, but also a non-flexible screen. As shown in FIG. 5, the electronic device 80 is attached to a side of another electronic device 70. Particularly, there is a communication interface on a side of the electronic device 70 opposite to a first side 701. In addition, there is another communication interface on a side of the electronic device 80 opposite to a display unit 801. When the two communication interfaces are connected together, the electronic device 80 is attached to the electronic device 70, and may be maintained in a relative position relationship with the electronic device 70, i.e. in an attachment state, until the two electronic devices are separated from each other by the user.

When the electronic device 80 is attached to the electronic device 70, the data on the electronic device 70 may be displayed on the display unit 801 by the data acquisition unit 802, such as a communication unit, via a communication interface. If the electronic device 70 also has a display unit arranged on the first side 701, contents displayed on the two display units may be the same or different.

In a fifth example, also as shown in FIG. 5, compared with the fourth example, the data acquisition unit 802 in this example is further configured to acquire a state of the electronic device 80 per se. For example, the data acquisition unit 802 further includes a gravity sensor configured to detect a space posture of the electronic device 80. In the present example, data collected by the data acquisition unit 802 further include internal data.

One or more technical solutions according to the embodiments of the present disclosure provide at least the following technical effects or advantages.

In an embodiment of the present disclosure, an electronic device includes a display unit and a data acquisition unit, wherein the electronic device can be attached to an object and can be maintained in a relative position relationship with the object, and at least a part of the electronic device and an external surface of the object meet a predefined condition; and the data acquisition unit is connected to the display unit, and is configured to acquire object data when the electronic device is attached to the object; and the display unit is further configured to display the data. It can be seen that the electronic device according to the present embodiment can be attached to the object, can be maintained in a relative position relationship with the object, and can acquire data related to the object to which the electronic device is attached, thereby displaying the acquired data on the display unit. In other words, the electronic device according to the embodiment of the present disclosure may be used as a display accessory, achieving the technical effect of enabling an object which is a non-electronic device and an electronic device without a display unit to have a display unit. In addition, the electronic device may be applicable to a variety of objects, thereby saving cost of manufacturing a plurality of displays. Further, as the electronic device is attached to the object and can be maintained in a relative position relationship with the object, integration between the electronic device and the object may be enhanced.

Obviously, those skilled in the art can make various modifications and variations to the present disclosure without departing from the spirit and scope of the present disclosure. Thus, if these modifications and variations of the present disclosure belong to the scope of the claims of the present disclosure and the equivalent technologies thereof, the present disclosure is also intended to include these modifications and variations.

What is claimed is:

1. An electronic device, comprising a display unit, a plurality of different types of data acquisition units, and a detector, wherein
the electronic device can be attached to one of a plurality of different types of objects and can be maintained in a relative position relationship with the attached object, and at least a part of the electronic device and an external surface of the attached object meet a predefined condition;
the detector is configured to detect a type of the object to which the electronic device is attached, so that at least one of the plurality of different types of data acquisition units corresponding to the detected type of the attached object is turned on; and
the plurality of different types of data acquisition units are connected to the display unit, each data acquisition unit being configured to acquire data related to the attached object of the detected type when the data acquisition unit is turned on; and the display unit is further configured to display the attached data,
wherein when the detector detects that the electronic device is attached to an object other than at least a part of human body, at least one of the plurality of different types of data acquisition units corresponding to the detected type of the attached object is turned on to acquire data related to the attached object of the detected type, and the acquired data related to the attached object of the detected type are displayed on the display unit; and
wherein at least one type of data associated with the attached object is acquired and displayed on the display unit as a function of the detected type of the attached object.

2. The electronic device according to claim 1, wherein the display unit has a first state in which the display unit is a non-planar display unit.

3. The electronic device according to claim 2, wherein the display unit further has a second state in which a curvature of the display unit is different from that in the first state, or in which a shape of the display unit is different from that in the first state.

4. The electronic device according to claim 3, wherein the display unit can be switched between the first state and the second state according to a shape of the object to which the electronic device is attached.

5. The electronic device according to claim 1, wherein the data acquisition unit further comprises an internal collection unit and/or an external collection unit, wherein the internal collection unit is configured to collect state data of the electronic device; and the external collection unit is configured to collect data unrelated to the electronic device.

6. The electronic device according to claim 5, wherein the data unrelated to the electronic device comprise environment data and/or operator data.

7. The electronic device according to claim 1, wherein the data acquisition unit further comprises a transceiver configured to communicate data with a second electronic device.

8. The electronic device according to claim 7, wherein the transceiver comprises a communication connection interface, through which the electronic device can be attached to the second electronic device when the electronic device is connected to the second electronic device.

9. The electronic device according to claim 5, wherein the data acquisition unit further comprises a transceiver configured to communicate data with a second electronic device.

10. The electronic device according to claim 9, wherein the transceiver comprises a communication connection interface, through which the electronic device can be attached to the second electronic device when the electronic device is connected to the second electronic device.

11. The electronic device according to claim 1, further comprising:
a connection unit configured to fix the electronic device to the object.

12. The electronic device according to claim 1, wherein the electronic device is a deformable device and can be attached to the object by deformation.

* * * * *